(12) United States Patent
Hsieh

(10) Patent No.: US 11,401,001 B1
(45) Date of Patent: Aug. 2, 2022

(54) BICYCLE PEDAL STRUCTURE

(71) Applicant: Chin-Long Hsieh, Taichung (TW)

(72) Inventor: Chin-Long Hsieh, Taichung (TW)

( * ) Notice: Subject to any disclaimer, the term of this patent is extended or adjusted under 35 U.S.C. 154(b) by 0 days.

(21) Appl. No.: 17/474,098

(22) Filed: Sep. 14, 2021

(51) Int. Cl.
  *B62M 3/00* (2006.01)
  *B62M 3/12* (2006.01)
  *B62M 3/08* (2006.01)

(52) U.S. Cl.
  CPC .............. *B62M 3/12* (2013.01); *B62M 3/08* (2013.01)

(58) Field of Classification Search
  CPC .................................. B62M 3/08; B62M 3/12
  See application file for complete search history.

(56) References Cited

U.S. PATENT DOCUMENTS

| | | | | |
|---|---|---|---|---|
| 3,709,058 A | * | 1/1973 | Pawsat | B62M 3/12 74/594.4 |
| 3,796,110 A | * | 3/1974 | Hagenah | B62M 3/12 74/594.4 |
| 4,063,798 A | * | 12/1977 | Pawsat | B62M 3/12 359/521 |
| 9,663,185 B2 | * | 5/2017 | Chen | B62M 3/08 |
| 2019/0210679 A1 | * | 7/2019 | Hyeon | B62J 6/06 |

FOREIGN PATENT DOCUMENTS

| | | | | |
|---|---|---|---|---|
| CH | 368389 A | * | 3/1963 | ............ B62M 3/12 |
| CN | 104973200 A | * | 10/2015 | |
| DE | 2437479 A1 | * | 2/1976 | ............ B62M 3/12 |
| FR | 1055984 A | * | 2/1954 | ............ B62M 3/12 |
| GB | 782201 A | * | 9/1957 | ............ B62M 3/12 |
| GB | 847169 A | * | 9/1960 | ............ B62M 3/12 |
| IT | 1143104 B | * | 10/1986 | ............ B62M 3/08 |

OTHER PUBLICATIONS

Machine translation of CN 104973200 A obtained on Jan. 19, 2022.*

* cited by examiner

*Primary Examiner* — Adam D Rogers

(57) ABSTRACT

A bicycle pedal structure includes a pedal body, two reflectors, two first anti-slip plates and two second anti-slip plates. The pedal body has a first tread and a second tread. An outer edge of each of two opposite sides of the first tread and the second tread is formed with a recess. A part of each reflector is embedded in one of the recesses. The two first anti-slip plates are separately mounted on the opposite sides of the first tread and the second tread by first screws. Each first anti-slip plate presses one of the reflectors. The two second anti-slip plates are separately mounted on the opposite sides of the first anti-slip plates by second screws.

5 Claims, 5 Drawing Sheets

BICYCLE PEDAL STRUCTURE

BACKGROUND

Technical Field

The invention relates to bicycles, particularly to bicycle pedals.

Related Art

Most bicycles are equipped with reflectors for reflecting lights to rear vehicles to warn or show the position of the bicycle. Especially in night or low-light circumstances, reflectors installed on pedals must increase traffic safety for bicycle riders no doubt. However, how to mount a reflector on a pedal is numerous, such as adhesion or riveting. Such installations tend to cause separation after a long-term outdoor use. This will seriously affect riding safety, so it needs to be solved.

SUMMARY

An object of the invention is to provide a bicycle pedal structure, which prevents reflectors from separating and enhances the anti-slip effect.

A bicycle pedal structure includes a pedal body, two reflectors, two first anti-slip plates and two second anti-slip plates. The pedal body has a first tread and a second tread. An outer edge of each of two opposite sides of the first tread and the second tread is formed with a recess. A part of each reflector is embedded in one of the recesses. The two first anti-slip plates are separately mounted on the opposite sides of the first tread and the second tread by first screws. Each first anti-slip plate presses one of the reflectors. The two second anti-slip plates are separately mounted on the opposite sides of the first anti-slip plates by second screws.

In view of this, the inventors have devoted themselves to the above-mentioned prior art, researched intensively and cooperated with the application of science to try to solve the above-mentioned problems. Finally, the invention which is reasonable and effective to overcome the above drawbacks is provided.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
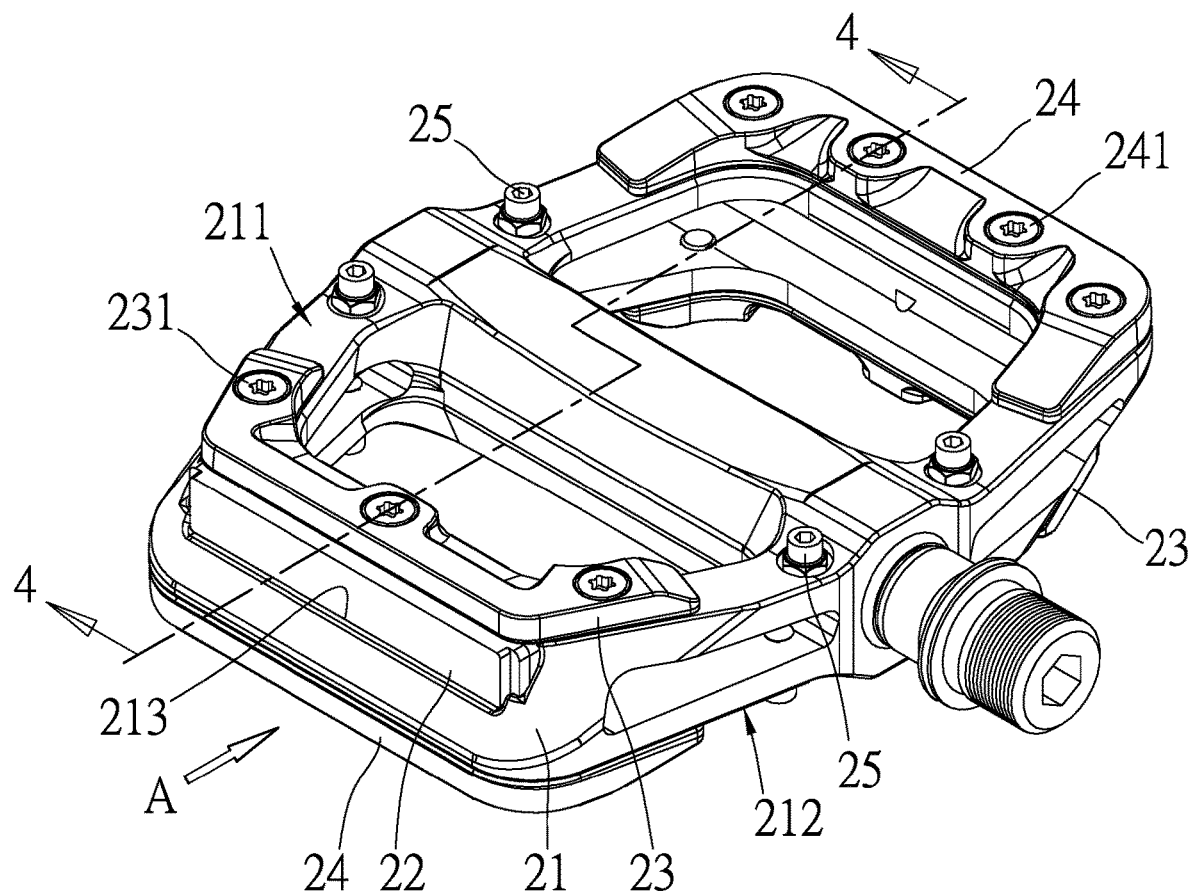
FIG. 1 is a perspective view of the first embodiment of the invention.
Figure 2:
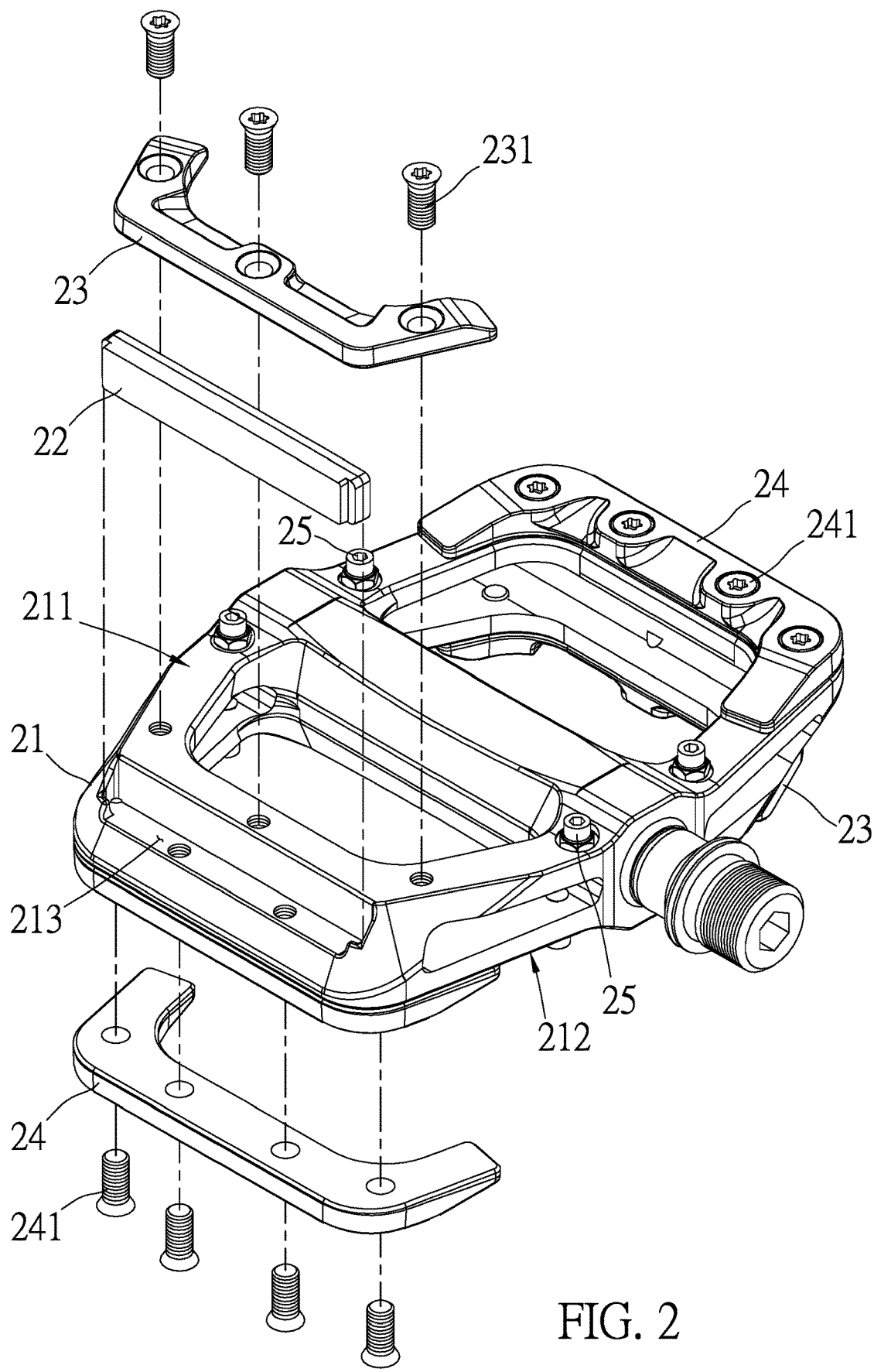
FIG. 2 is an exploded view of the first embodiment of the invention.
Figure 3:
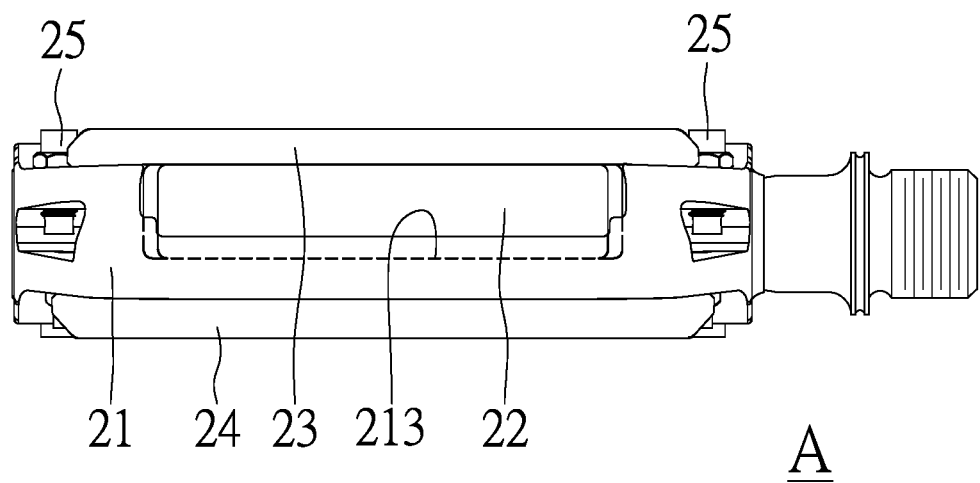
FIG. 3 is a plan view from direction A in FIG. 1.

Please refer to FIGS. 1-3, which shows the first embodiment of the invention. The bicycle pedal structure of the invention includes a pedal body 21, two reflectors 22, two first anti-slip plates 23 and two second anti-slip plates 24. The pedal body 21 has a first tread 211 and a second tread 212. An outer edge of each of two opposite sides of the first tread 211 and the second tread 212 is formed with a recess 213.

In the embodiment, the reflectors 22 are reflecting plates. A part of each reflector 22 is embedded in one of the recesses 213. The reflector 22 has a T-shaped cross-section and the recess 213 has a corresponding shape. An upper surface of each reflector 22 which has been embedded in the recess 213 is flush with the first tread 211 or the second tread 212 of the pedal body 21.

Figure 4:
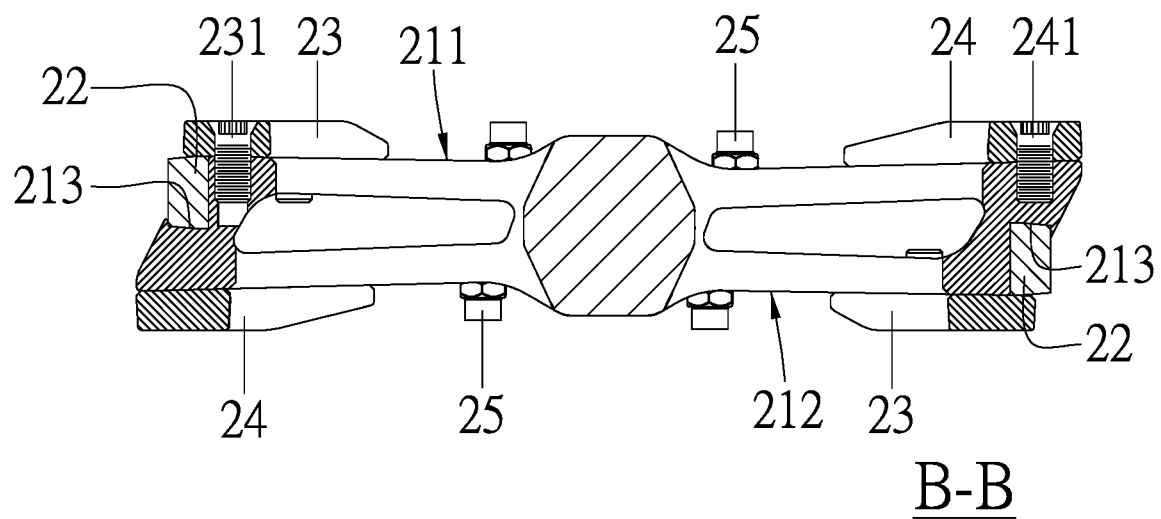
FIG. 4 is a cross-sectional view along line 4-4 in FIG. 1.

The two first anti-slip plates 23 are separately mounted on the opposite sides of the first tread 211 and the second tread 212 by first screws 231. The first anti-slip plate 23 slightly protrudes from the recess 213 to press an upper edge of the reflector 22 as shown in FIGS. 1 and 4. Two ends of the first snit-slip plate 23 are bent to correspond to the shape of the pedal body 21.

The two second anti-slip plates 24 are separately mounted on the opposite sides of the first anti-slip plates 23 by second screws 241 as shown in FIGS. 1 and 4. Two ends of the second snit-slip plate 24 are bent to correspond to the shape of the pedal body 21. The pedal body 21 is provided with anti-slip studs 25 penetrating pedal body 21.

Please refer to FIG. 2. When assembling, an end of each reflector 22 is embedded into one of the recesses 213, and then the first anti-slip plates 23 are fixed on opposite sides of the first tread 211 and the second tread 212 by the first screws 231. The first snit-slip plates 23 slightly protrude from the recesses 213 to press the reflectors 22. Thus, the reflectors 22 can be firmly fixed on the pedal body 21 by both being embedded in the recesses 213 and being pressed by the first anti-slip plates 23

Figure 5:
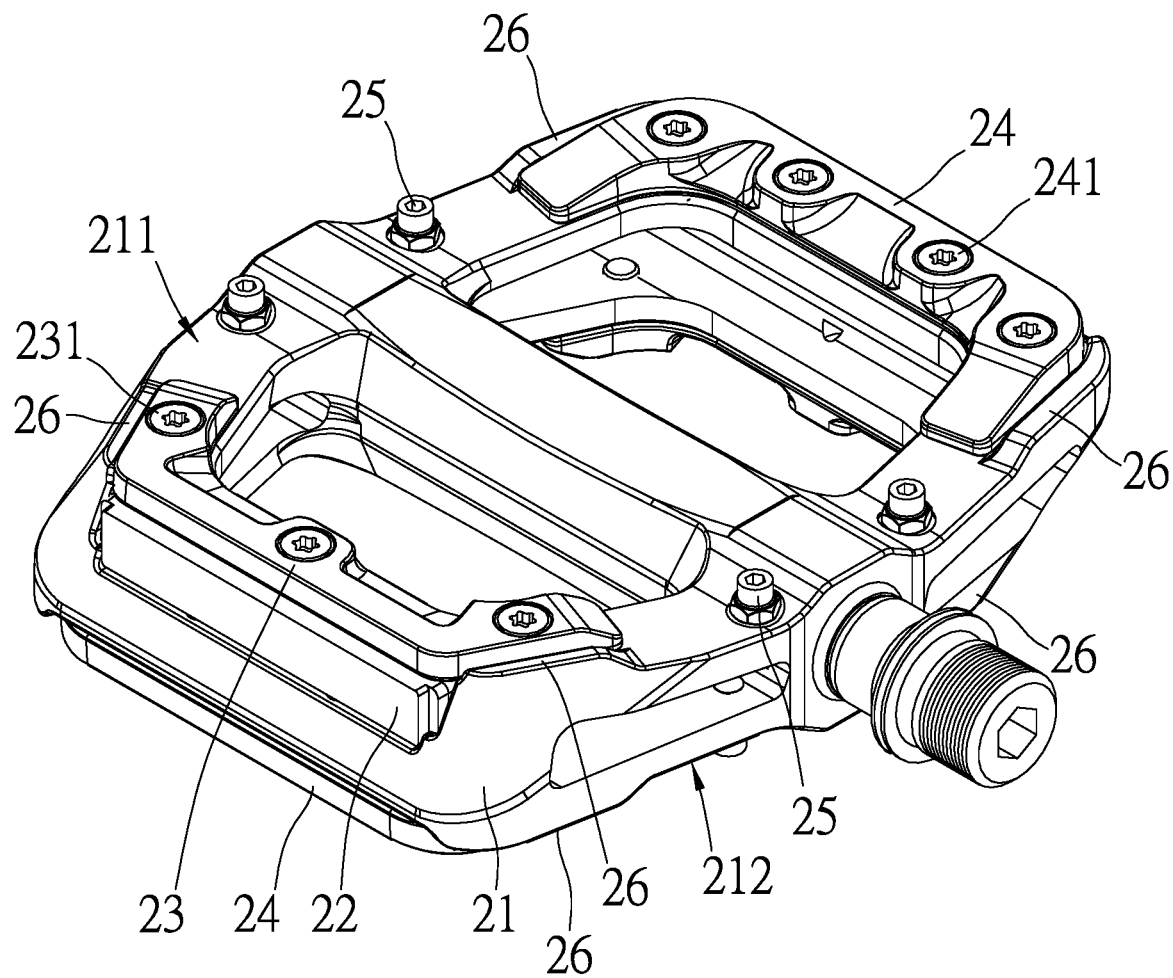
FIG. 5 is a perspective view of the second embodiment of the invention.
Figure 6:
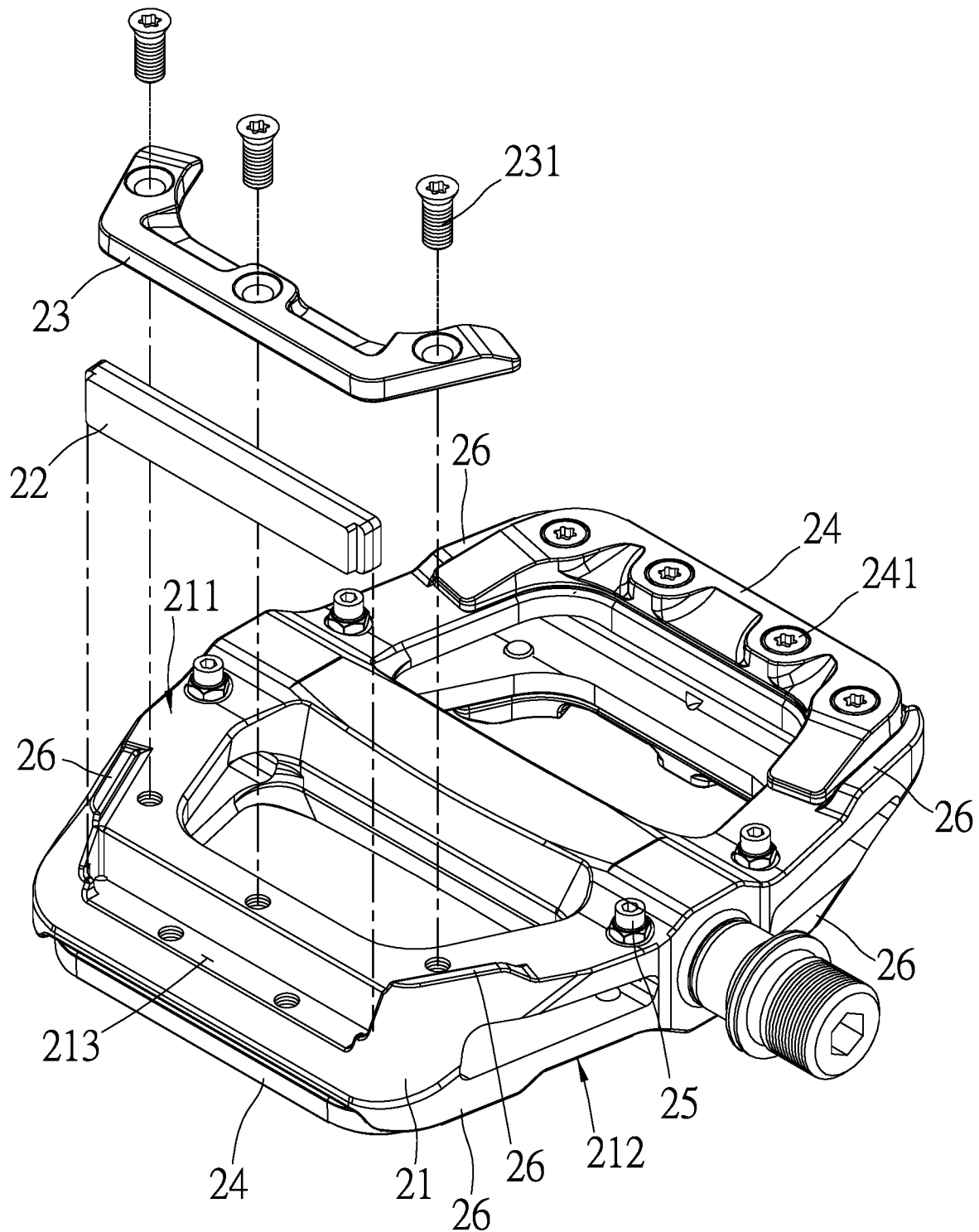
FIG. 6 is an exploded view of the second embodiment of the invention.

Please refer to FIGS. 5 and 6, which show the second embodiment of the invention. The second embodiment differs from the first embodiment by two pair of limiting flanges 26 formed on each of the first tread 211 and the second tread 212 of the pedal body 21 for separately restraining each of the first and second anti-slip plates 23, 24. This can enhance the fixing stability of the first and second anti-slip plates 23, 24.

The first anti-slip plates 23 not only provide an anti-slip effect, but also help to fix the reflectors 22 to avoid separation.

While this disclosure has been described by means of specific embodiments, numerous modifications and variations could be made thereto by those skilled in the art without departing from the scope and spirit of this disclosure set forth in the claims.

What is claimed is:

1. A bicycle pedal structure comprising:
   a pedal body, having a first tread and a second tread, an outer edge of the first tread being formed with a recess, and an outer edge of the second tread being formed with a recess that is opposite to the recess of the outer edge of the first tread;
   two reflectors, a part of one being embedded in the recess in the first tread, and a part of another one being embedded in the recess in the second tread;
   two first anti-slip plates, separately mounted on the opposite sides of the first tread and the second tread by first screws, one of the first anti-slip plates pressing against the reflector located in the recess formed in the first tread, and another one of the first anti-slip plates pressing against the reflector located in the recess formed in the second tread; and two second anti-slip plates, separately mounted on the opposite sides of the first anti-slip plates by second screws;

wherein an upper surface of each reflector is flush with the first tread or the second tread.

2. The bicycle pedal structure of claim 1, wherein the reflectors are reflecting plates.

3. The bicycle pedal structure of claim 1, wherein the pedal body is provided with anti-slip studs penetrating the pedal body.

4. A bicycle pedal structure comprising:

a pedal body, having a first tread and a second tread, an outer edge of the first tread being formed with a recess, and an outer edge of the second tread being formed with a recess that is opposite to the recess of the outer edge of the first tread;

two reflectors, a part of one being embedded in the recess in the first tread, and a part of another one being embedded in the recess in the second tread;

two first anti-slip plates, separately mounted on the opposite sides of the first tread and the second tread by first screws, one of the first anti-slip plates pressing against the reflector located in the recess formed in the first tread, and another one of the first anti-slip plates pressing against the reflector located in the recess formed in ale second tread; and two second anti-slip plates, separately mounted on the opposite sides of the first anti-slip plates by second screws;

wherein each reflector has a T-shaped cross-section.

5. A bicycle pedal structure comprising:

a pedal body, having a first tread and a second tread, an outer edge of the first tread being formed with a recess, and an outer edge of the second tread being formed with a recess that is opposite to the recess of the outer edge of the first tread;

two reflectors, a part of one being embedded in the recess in the first tread, and a part of another one being embedded in the recess in the second tread;

two first anti-slip plates, separately mounted on the opposite sides of the first tread and the second tread by first screws, one of the first anti-slip plates pressing against the reflector located in the recess formed in the first tread, and another one of the first anti-slip plates pressing against the reflector located in the recess formed in the second tread;

two second anti-slip plates, separately mounted on the opposite sides of the first anti-slip plates by second screws; and two pair of limiting flanges formed on each of the first tread and the second tread for separately restraining each of the first and second anti-slip plates;

wherein two ends of each of the first anti-slip plates and the second anti-slip plates are bent to correspond to a shape of the pedal body.

\* \* \* \* \*